United States Patent
Chou et al.

(10) Patent No.: US 9,073,285 B2
(45) Date of Patent: Jul. 7, 2015

(54) FOAM BASE WITH CONNECTION STRUCTURE

(71) Applicant: LIANG HAW TECHNOLOGY CO., LTD., Taipei County (TW)

(72) Inventors: Fang-Juei Chou, Taipei (TW); Han-Hsing Hsiung, Taipei County (TW); Li-Chun Yu, Taipei County (TW); Chun-Yung Yu, Taipei (TW)

(73) Assignee: Liang Haw Technology Co., Ltd., Taipei County (TW)

( * ) Notice: Subject to any disclaimer, the term of this patent is extended or adjusted under 35 U.S.C. 154(b) by 0 days.

(21) Appl. No.: 13/738,020

(22) Filed: Jan. 10, 2013

(65) Prior Publication Data

US 2013/0122237 A1 May 16, 2013

Related U.S. Application Data

(63) Continuation-in-part of application No. 12/397,401, filed on Mar. 4, 2009, now abandoned.

(30) Foreign Application Priority Data

Nov. 21, 2008 (TW) ............... 97145206 A

(51) Int. Cl.
| | | |
|---|---|---|
| *B32B 3/06* | (2006.01) | |
| *B32B 7/12* | (2006.01) | |
| *E04F 15/18* | (2006.01) | |
| *E04F 15/02* | (2006.01) | |
| *E04F 15/20* | (2006.01) | |
| *E04B 1/80* | (2006.01) | |

(52) U.S. Cl.
CPC ............... *B32B 3/06* (2013.01); *Y10T 428/197* (2015.01); *Y10T 428/24752* (2015.01); *Y10T 428/24777* (2015.01); *B32B 7/12* (2013.01); *E04F 15/18* (2013.01); *E04B 1/80* (2013.01); *E04F 15/02038* (2013.01); *E04F 15/203* (2013.01); *E04F 2201/07* (2013.01)

(58) Field of Classification Search
USPC ...................... 428/61, 192, 189, 58
See application file for complete search history.

(56) References Cited

U.S. PATENT DOCUMENTS

| | | | |
|---|---|---|---|
| 5,591,521 A * | 1/1997 | Arakawa et al. | 428/352 |
| 5,942,308 A * | 8/1999 | Arakawa et al. | 428/130 |
| 2004/0018354 A1 * | 1/2004 | May | 428/317.3 |
| 2010/0129638 A1 * | 5/2010 | Chou et al. | 428/316.6 |

* cited by examiner

*Primary Examiner* — Hai Vo
(74) *Attorney, Agent, or Firm* — Rosenberg, Klein & Lee

(57) ABSTRACT

A foam base with a connection structure includes the foam base and a connection member. The connection member includes an adhesive connection portion and a folding portion. The adhesive connection portion is adhered to the foam base so that the connection member is fixed on the foam base. The folding portion is used to connect another adjacent foam base. Before connection, the folding portion is folded and only has a portion extending out of the foam base for transportation and storage.

5 Claims, 4 Drawing Sheets

FOAM BASE WITH CONNECTION STRUCTURE

REFERENCE TO RELATED APPLICATION

This Application is being filed as a Continuation-in-Part of patent application Ser. No. 12/397,401, filed 4 Mar. 2009, now abandoned.

BACKGROUND OF THE INVENTION

1. Field of the Invention

The present invention relates to a foam base, and more particularly to a foam base with a connection structure for storage, transportation and use.

2. Description of the Prior Art

In general, a conventional interior decoration way uses a foam base as a bottom base. For example, before paving a carpet, floor boards or wood boards in a room, the floor is first paved with a foam base. The foam base has soundproof, heatproof and waterproof characteristics and is cheap and can be manufactured easily.

However, the size of the foam base is limited. It is not practical to make a foam base for the size of a room. This will greatly increase difficulty in transportation and storage. Thus, when the user wants to pave the foam base on a large-sized floor, a plurality of foam bases is connected together to become a large-sized foam base.

There are two connection ways for a large-sized foam base. One is that the edge of the foam base is provided with an adhesive tape to connect an adjacent foam base so that adjacent foam bases can be connected to become a large-sized foam base. This connection way easily causes an uneven surface and a gap at the joint of the foam bases, unable to ensure soundproof and heatproof effects.

The other is that the surface of each foam base is provided with a thin connection layer. The length of the connection layer is equal to that of the foam base. The connection layer is adhered to the foam base in an interlaced way. One end of the connection layer is disposed on the surface of the foam base, and the other end of the connection layer extends out of the foam base. The other portion of the surface of the foam base, not having the connection layer is provided with a two-sided adhesive tape. To connect two foam bases, the other end of the connection layer on one foam base is adhered to the portion with two-sided adhesive tape on the surface of the adjacent foam base to constitute a large-sized foam base. However, this connection way is complicated and increases the cost, which is not beneficial for promotion of the industry.

Accordingly, the inventor of the present invention has devoted himself based on his many years of practical experiences to solve this problem.

SUMMARY OF THE INVENTION

The primary object of the present invention is to provide a foam base with a connection structure which provides a connection member on the foam base to connect another foam base. Before connection, the connection member can be folded for storage and transportation.

Another object of the present invention is to provide a foam base with a connection structure which provides a connection member that can be folded in different forms. The connection member has one end extending out of the foam base for the user to pull it so that many foam bases can be connected quickly and conveniently when in use.

A further object of the present invention is to provide a foam base with a connection structure which provides a connection member that can be reused many times. The present invention is economic and practical.

In order to achieve the aforesaid objects, a foam base with a connection structure is provided. The present invention comprises a foam base and a connection member. The foam base has an edge. The connection member comprises an adhesive connection portion and a folding portion. The adhesive connection portion is adhered to the foam base and located close to the edge of the foam base. The folding portion has a first folding point between the adhesive connection portion and the folding portion. One side of the folding portion, facing the foam base when the folding portion is pulled flat, is provided with viscose. Thus, the user can connect and assemble many foam bases conveniently and quickly through the connection member.

DETAILED DESCRIPTION OF THE PREFERRED EMBODIMENTS

Embodiments of the present invention will now be described, by way of example only, with reference to the accompanying drawings.

Figure 1A:
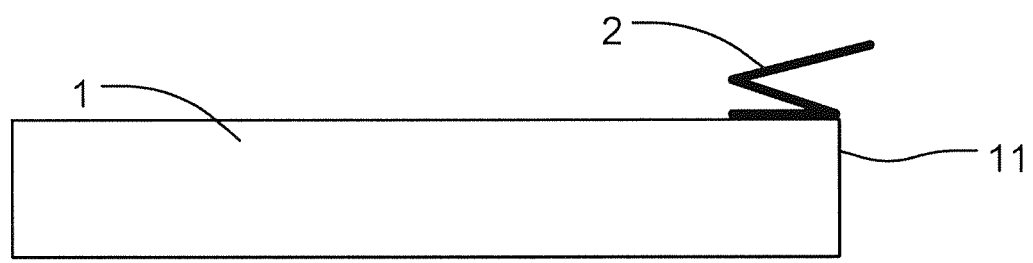
FIG. 1A is a schematic view of the present invention.
Figure 1B:
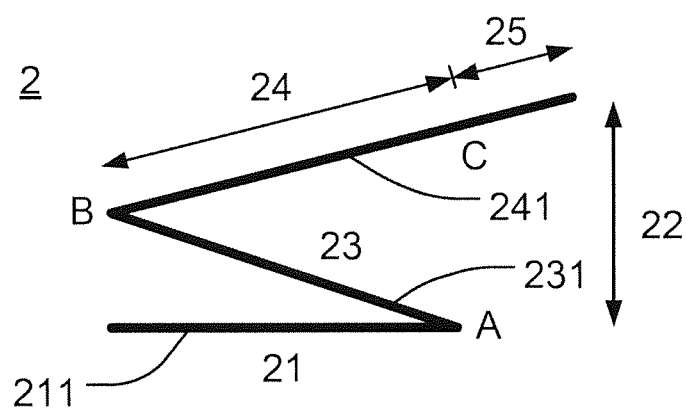
FIG. 1B is a schematic view of the present invention showing the connection member.

As shown in FIG. 1A and FIG. 1B, the present invention comprises a foam base 1, an edge 11, a connection member 2, an adhesive connection portion 21, a folding portion 22, a first folding point A and a second folding point B.

The foam base 1 is made of plastic, polypropylene, rubber or a composite having an even thickness and a plate shape, and used to pave the floor. Thus, the foam base 1 can be cut in advance or direct manufactured in the form of a plate for transportation and storage. When in use, many foam bases can be connected to become a large-sized foam base.

The connection member 2 comprises the adhesive connection portion 21 and the folding portion 22. The adhesive connection portion 21 is adhered to the foam base 1 and located close to the edge 11 of the foam base 1. The folding portion 22 of the connection member 2 faces the outside of the foam base 1.

The folding portion 22 initially extends out of the foam base 1. For transportation and storage, the first folding point A is disposed between the adhesive connection portion 21 and the folding portion 22. The folding portion 22 can be inward folded at the first folding point A and toward the inside of the foam base 1 to shorten its length. The folding portion 22 has at least one second folding point B for the user to touch the folding portion 22 easily when the folding portion 22 is folded, such that the folding portion 22 is folded reversely toward the edge 11 of the foam base 1. In a preferred embodiment, the folding portion 22 has a protruding portion 25 which extends out of the edge 11 of the foam base 1 when the folding portion 22 is reversely folded toward the edge 11 of the foam base 1.

The connection member 2 has a protrusion point C at an inner side of the protruding portion 25. The protrusion point C is as the critical point to extend out of the edge 11. Furthermore, the adhesive connection portion 21 has an adhesive connection surface 211 relative to the foam base 1. The adhesive connection surface 211 is provided with viscose to adhere to the foam base 1. The folding portion 22 is divided into a first folding section 23 between the first folding point A and the second folding point B and a second folding section 24 between the second folding point B and the protrusion point C. The first folding section 23 and the second folding section 24 respectively have a first connection surface 231 and a second connection surface 241 facing each other. When the connection member 2 is fully extended, the adhesive connection surface 211, the first connection surface 231 and the second connection surface 241 are at the same level. The first connection surface 231 and the second connection surface 241 are provided with viscose, namely, one side of folding portion 22, facing the foam base 1 when the folding portion 22 is pulled flat, is provided with viscose. Both sides of the protruding portion 25 don't have viscose so that the protruding portion 25 is as the portion for the user to pull the folding portion 22.

Figure 2A:
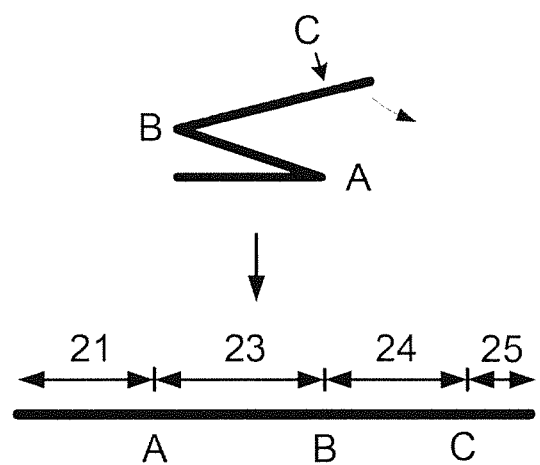
FIG. 2A is a schematic view of the present invention showing the connection member being pulled.
Figure 2B:
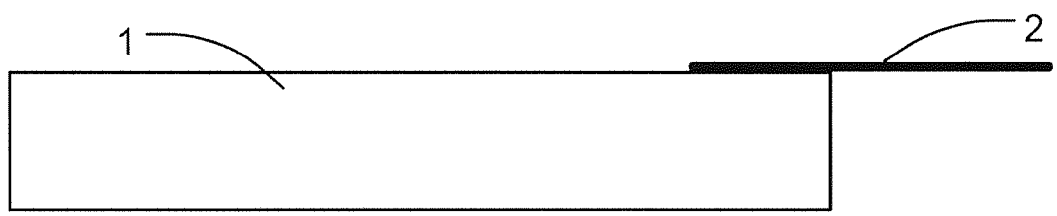
FIG. 2B is a schematic view of the present invention showing the connection member on the foam base being pulled flat.

Referring to FIG. 2A and FIG. 2B, when in use, the folding portion 22 of the connection member 2 is pulled flat for the connection member 2 to adhere to the joint of two foam bases 1. That is to say, the protruding portion 25 is pulled out toward the edge 11. At this time, the adhesive connection portion 21 is adhered to the foam base 1, so the adhesive connection portion 21 won't be moved. The first connection surface 231 and the second connection surface 241 of the folding portion 22 adhere to the other foam base 1. When the folding portion 22 is pulled flat, the first connection surface 231 and the second connection surface 241 to get contact with the other foam base 1 are provided with viscose. The viscosity of the viscose of the first connection surface 231 and the second connection surface 241 is less than that of the adhesive connection surface 211 of the adhesive connection portion 21. The design of the viscosity is to consider not only the stability when the folding portion 22 is extended but also the reuse and return operation when the folding portion 22 is folded. When the folding portion 22 is folded, the viscose of the first connection surface 231 and the second connection surface 241 won't cause the first connection surface 231 and the second connection surface 241 to completely adhere to each other. The first connection surface 231 and the second connection surface 241 can be opened again to connect the foam base 1. The viscose ensures that a plurality of foam bases 1 won't be separated from each other.

Figure 3A:
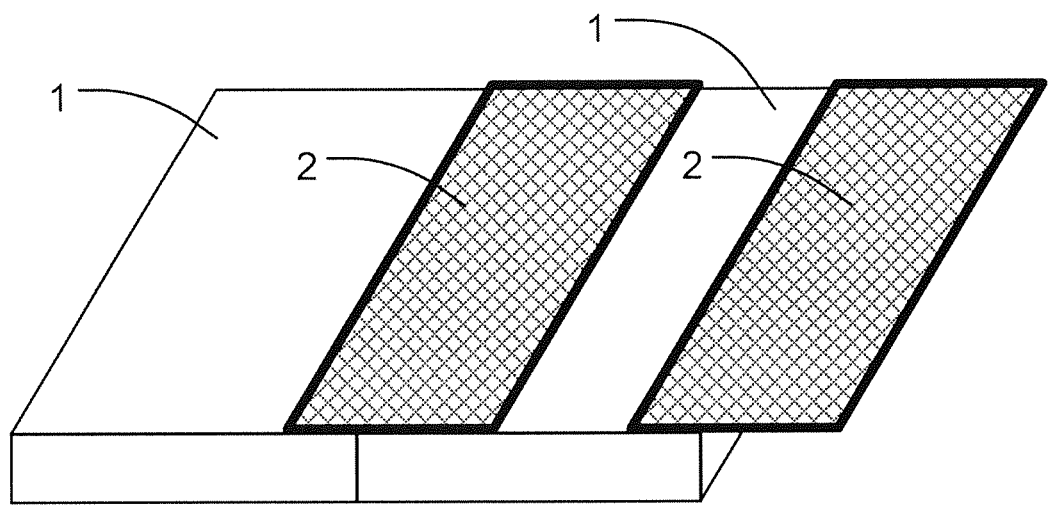
FIG. 3A is a schematic view of the present invention showing two adjacent foam bases connected by the connection member.
Figure 3B:
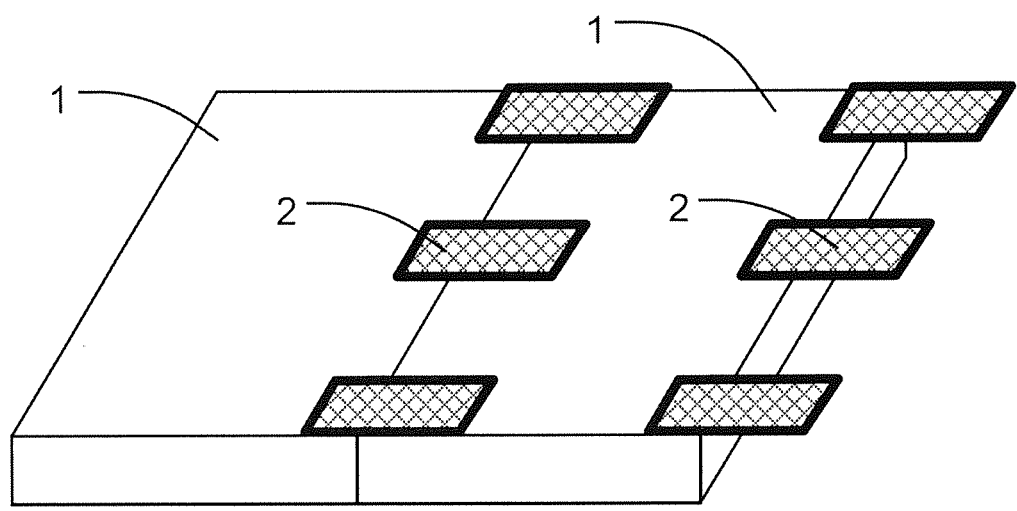
FIG. 3B is a schematic view of the present invention showing two adjacent foam bases connected by a plurality of spaced connection members.

Referring to FIG. 3A and FIG. 3B, a plurality of foam bases 1 is connected together through the connection member 2. Two adjacent foam bases 1 are connected by the connection member 2 in the form of long strip, as shown in FIG. 3A. Alternatively, two adjacent foam bases 1 are connected by a plurality of spaced connection members 2 in the form of short strip, as shown in FIG. 3B. The connection members 2 of one foam base 1 are fully pulled flat to adhere to the adjacent foam base 1 so that the foam bases 1 are connected together to become a large-sized foam base.

The connected large-sized foam base 1 can be used as the base of a carpet, floor boards or wood boards, providing soundproof, heatproof and waterproof effects. When in use, the connection member 2 of the present invention can fully seal the gap at the joint of the foam bases to ensure the soundproof and the heat proof effects. The connection member 2 is very thin, so it won't cause an uneven connection between two foam bases 1.

Figure 4A:
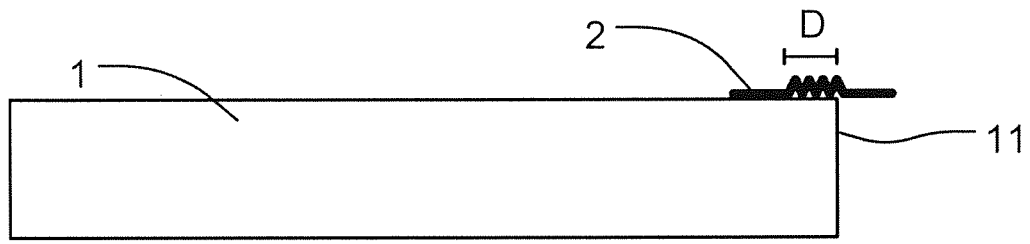
FIG. 4A is a schematic view of another embodiment of the present invention.
Figure 4B:
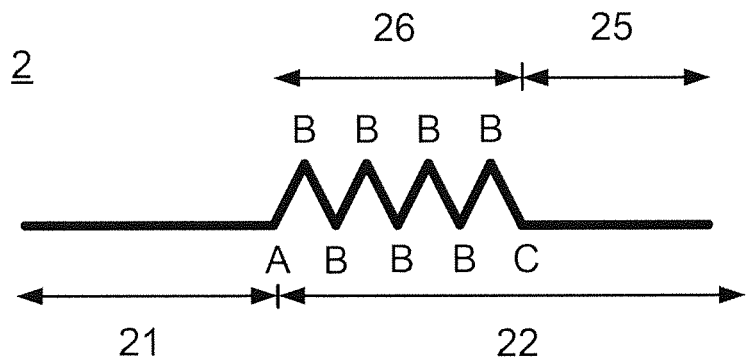
FIG. 4B is a schematic view of another embodiment of the present invention showing the connection member.
Figure 4C:
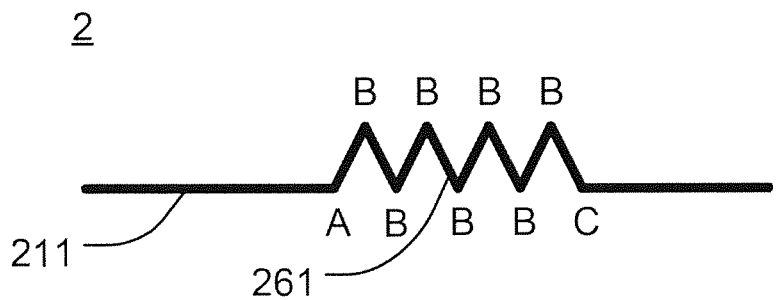
FIG. 4C is another schematic view of another embodiment of the present invention showing the connection member.

In the aforesaid embodiment, when the folding portion 22 is folded on the foam base 1, the folding portion 22 is parallel to and folded on the surface of the foam base 1. In another form, the folding portion 22 can be vertically folded. Referring to FIG. 4A, FIG. 4B and FIG. 4C, the folding portion 22 of the connection member 2 has a plurality of second folding points B. When the folding portion 22 is folded, the folding portion 22 is repeatedly folded up and down at the second folding points B to form a wavy section 26. The outer end of the wavy section 26 is connected with the protruding portion 25. In this folding way, the folding portion 22 doesn't be folded reversely toward the inner side of the foam base 1, so the adhesive connection portion 22 is disposed inward and there is a distance D defined from the outer end of the adhesive connection portion 22 to the edge 11 of foam base 1 for the wavy section 26 of the folding portion 22. Thus, the wavy section 26 won't protrude out of the edge 11 of the foam 1. Overall, the adhesive connection portion 21 is still disposed close to the edge 11 of the foam base 1.

The adhesive connection portion 21 is also adhered to the foam base 1 and the adhesive connection portion 21 won't be moved. By pulling the protruding portion 25, the folding portion 22 is pulled flat to get contact with another foam base 1. The wavy section 26 has a third connection surface 261 between the first point A and the protrusion point C. The second connection surface 261 is provided with viscose. The viscosity of the viscose of the third connection surface 261 is less than that of the adhesive connection surface 211 of the adhesive connection portion 21.

The foam base with a connection structure of the present invention has many advantages. In consideration of manufacture, storage, transportation and use of foam bases, each foam base is provided with the connection structure. Before connecting the foam bases to become a large-sized foam base through the connection structure, the use and storage of the connection member is also considered. Through the design of the folding portion to be folded, the folding portion can be kept well before connection and can be used conveniently and quickly for assembly. The folding portion is pulled flat for adhesion. The foam base with the connection structure is economic and practical.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A foam base with a connection structure, comprising:
    the foam base having an edge; and
    a connection member comprising an adhesive connection portion and a folding portion, the adhesive connection portion being provided with viscose to adhere to the foam base and located close to the edge of the foam base, the folding portion having a first folding point between the adhesive connection portion and the folding portion, one side of the folding portion, facing the foam base when the folding portion is pulled flat, being provided with viscose, the folding portion divided into a first folding section between the first folding point and a second folding point and a second folding section between the second folding point and a protrusion point of a protruding portion, the protrusion point as a critical point to extend out of the edge of the foam base, both sides of the protruding portion having no viscose, wherein the protruding portion is defined as a continuing portion of the second folding section, a first connection surface of the first folding section and a second connection surface of the second folding section facing each other when the folding portion are folded on the foam base, the length of the folding portion is larger than the length of the adhesive connection portion while the folding portion is extended to be pulled flat for adhering to an adjacent foam base; the folding portion has a first connection surface corresponding to the first folding section and a second connection surface corresponding to the second folding section, the first connection surface and the second connection surface are provided with viscose, wherein the viscosity of the viscose of the first and second connection surfaces is less than that of the adhesive connection portion.

2. The foam base with a connection structure as claimed in claim 1, wherein when the folding portion is folded on the foam base, the folding portion is parallel to and folded on a surface of the foam base.

3. The foam base with a connection structure as claimed in claim 1, wherein the folding portion and the adhesive connection portion form a plane after the folding portion is extended; two adjacent foam bases are connected by the connection member in the form of long strip.

4. A foam base with a connection structure, comprising:
the foam base having an edge; and
a connection member comprising an adhesive connection portion and a folding portion, the adhesive connection portion being provided with viscose to adhere to the foam base and located close to the edge of the foam base, the folding portion having a first folding point between the adhesive connection portion and the folding portion, one side of the folding portion, facing the foam base when the folding portion is pulled flat, being provided with viscose, wherein the folding portion is folded on the foam base to form a wavy section having a plurality of second folding points between the first folding point and a protruding point of a protruding portion, the protruding point as a critical point to extend out of the edge of the foam base, and the protruding portion is defined as a continuing portion of the wavy section, both sides of the protruding portion having no viscose; the folding portion has a first connection surface corresponding to the first folding section and a plurality of second connection surfaces corresponding to the second folding section, the first connection surface and the plurality of second connection surfaces are provided with viscose such that the first connection surface and the plurality of second connection surfaces adhere to another foam base by the viscose when the folding portion is extended, wherein the viscosity of the viscose of the first connection surface and the plurality of second connection surfaces is less than that of the adhesive connection portion.

5. The foam base with a connection structure as claimed in claim 4, wherein the plurality of second connection surfaces abut upon a protruding portion, and the protruding portion protrudes out of the edge of the foam base.

\* \* \* \* \*